US 8,039,103 B2
Oct. 18, 2011

United States Patent
Tosaki et al.

(54) PRESSURE-SENSITIVE ADHESIVE TAPE OR SHEET

(75) Inventors: Yutaka Tosaki, Ibaraki (JP); Hideki Nagatsu, Ibaraki (JP); Shinichi Kouno, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 28 days.

(21) Appl. No.: 10/701,496

(22) Filed: Nov. 6, 2003

(65) Prior Publication Data

US 2004/0091689 A1    May 13, 2004

(30) Foreign Application Priority Data

Nov. 8, 2002   (JP) .............................. P. 2002-324967

(51) Int. Cl.
*B32B 7/12* (2006.01)
*B32B 27/30* (2006.01)

(52) U.S. Cl. ................. 428/355 AC; 428/343; 428/354; 428/355 R; 428/304.4; 428/317.1; 428/317.3; 524/556

(58) Field of Classification Search ............ 428/355 AC, 428/343, 354; 427/208.4; 442/151, 149
See application file for complete search history.

(56) References Cited

U.S. PATENT DOCUMENTS

| | | | | |
|---|---|---|---|---|
| 4,033,918 A | * | 7/1977 | Hauber | 524/296 |
| 4,076,661 A | * | 2/1978 | Kassner | 524/45 |
| 5,571,617 A | | 11/1996 | Cooprider et al. | |
| 5,783,209 A | * | 7/1998 | Imamura et al. | 424/448 |
| 6,103,316 A | | 8/2000 | Tran et al. | |
| 6,518,343 B1 | * | 2/2003 | Lucast et al. | 524/276 |
| 2003/0162886 A1 | * | 8/2003 | Tosaki et al. | 524/503 |
| 2004/0091689 A1 | * | 5/2004 | Tosaki et al. | 428/214 |
| 2005/0075444 A1 | * | 4/2005 | Tosaki et al. | 524/502 |

FOREIGN PATENT DOCUMENTS

| | | |
|---|---|---|
| EP | 0661302 A1 * | 12/1994 |
| EP | 1340797 A2 * | 9/2003 |
| EP | 1340797 A2 | 9/2003 |
| GB | 1409594 A * | 9/1976 |
| JP | 61-254678 A | 11/1986 |
| JP | 63-227682 | 9/1988 |
| JP | 63-317575 | 12/1988 |
| JP | 2-6584 A | 1/1990 |
| JP | 4-506984 A | 12/1992 |
| JP | 6-93239 A | 4/1994 |
| JP | 8-120251 | 5/1996 |
| JP | 8-157783 | 6/1996 |
| JP | 8-325307 A | 12/1996 |
| JP | 10-158609 | 6/1998 |
| JP | 10-292162 | 11/1998 |
| JP | 2000-239633 | 9/2000 |
| WO | 96-01295 A1 | 1/1996 |
| WO | 00-36043 A1 | 6/2000 |
| WO | 02-00800 A2 | 1/2002 |

OTHER PUBLICATIONS

Istvan Benedek and Luc J. Heymans, "Pressure-Sensitive Adhesive Technology", Marcel Dekker Inc., Chapter 8, p. 412, 1997.*

* cited by examiner

*Primary Examiner* — Alicia Chevalier
*Assistant Examiner* — Anish Desai
(74) *Attorney, Agent, or Firm* — Sughrue Mion, PLLC

(57) ABSTRACT

A pressure-sensitive adhesive tape or sheet is characterized by having a substrate having a pressure-sensitive adhesive layer on at least one side thereof, wherein the whole of the pressure-sensitive adhesive layer is formed of an aqueous dispersion type pressure-sensitive adhesive composition containing, as a base polymer, (A) an acrylic polymer containing a (meth)acrylic acid $C_{4-12}$ alkyl ester as the major monomer component; and in a surface portion of the pressure-sensitive adhesive layer within the range of up to 3 nm inward from the outer face of the pressure-sensitive adhesive layer, (B) an anionic emulsifier containing a sulfur atom is contained in a specific proportion, and (C) a hydrophilic polymer is contained in a specific proportion.

7 Claims, No Drawings

PRESSURE-SENSITIVE ADHESIVE TAPE OR SHEET

FIELD OF THE INVENTION

The present invention relates to a pressure-sensitive adhesive tape or sheet.

BACKGROUND OF THE INVENTION

Pressure-sensitive adhesives are widely used for masking tapes, double-sided tapes, surface protective films, wrapping tapes, and the like. Hitherto, as pressure-sensitive adhesives, development of organic solvent-free aqueous dispersion type pressure-sensitive adhesives have proceeded from the viewpoints of environmental measure, resource saving, safety, etc., and amounts of the aqueous dispersion type pressure-sensitive adhesives to be used tend to increase. Among such aqueous dispersion type pressure-sensitive adhesives, rubber based aqueous dispersion type pressure-sensitive adhesives are currently used in the most fields because they are limited in selectivity to adherends and are excellent in adhesion at low temperatures. Also, acrylic aqueous dispersion type pressure-sensitive adhesives are widely diffused in place of the conventional rubber based aqueous dispersion type pressure-sensitive adhesives because of their excellent adhesion characteristics and weather resistance (see Patent JP-A-62-221531, JP-A-63-317575, JP-A-5-39468, JP-A-8-104853, JP-A-8-157783, JP-A-10-292162, and JP-A-2000-239633). (The term "JP-A" as used herein means an "unexamined published Japanese patent application")

On the other hand, for example, the masking tapes mask an adherend during painting or sealing. However, when the surface of the adherend causes dew condensation during the works in the rainy season or at a low temperature in winter, a sufficient adhesion is not obtained at the time of sticking so that a slippage or peeling may possibly be caused, leading to a reduction in workability. Also, even in the double-sided tapes, there are works on the dewing surface, resulting in a problem.

Also, there is disclosed a pressure-sensitive adhesive tape containing a water-soluble polymer as the major component as one exhibiting good adhesion to the dewing surface (see JP-A-8-120251). However, in these conventional pressure-sensitive adhesive tapes, contamination due to low-molecular weight components eluted by water absorption and swelling at the time of peeling, or adhesive residue due to insufficient cohesion occurs, whereby satisfactory results were not obtained.

Moreover, after sticking the pressure-sensitive adhesive tape, the terminal end of the pressure-sensitive adhesive tape may possibly peel off during a period of curing or by window, resulting in a problem.

SUMMARY OF THE INVENTION

Accordingly, an object of the invention is to provide a pressure-sensitive adhesive tape or sheet capable of revealing a good initial adhesion against the dewing surface or wetting surface and having good peeling-preventing properties under constant load.

For the sake of attaining the foregoing object, the present inventors made extensive investigations. As a result, it has been found that by using a pressure-sensitive adhesive tape or sheet in which a pressure-sensitive adhesive layer is formed of an aqueous dispersion type pressure-sensitive adhesive composition containing specific amounts of a specific emulsifier and a specific hydrophilic polymer and using a specific acrylic pressure-sensitive adhesive, and a proportion of the specific emulsifier on the surface of the pressure-sensitive adhesive layer is defined, it is possible to improve the initial adhesion against the dewing surface or wetting surface and to improve the peeling-preventing properties under constant load (constant load peeling-preventing properties). The invention has been completed based on these findings.

Specifically, the invention is to provide a pressure-sensitive adhesive tape or sheet comprising a substrate having a pressure-sensitive adhesive layer on at least one side thereof, wherein the whole of the pressure-sensitive adhesive layer is formed of an aqueous dispersion type pressure-sensitive adhesive composition containing, as a base polymer, (A) an acrylic polymer containing a (meth)acrylic acid $C_{4-12}$ alkyl ester as the major monomer component; and in a surface portion of the pressure-sensitive adhesive layer within the range of up to 3 nm inward from the outer face of the pressure-sensitive adhesive layer, (B) an anionic emulsifier containing a sulfur atom is contained in a proportion of from 0.1 to 3 parts by weight based on 100 parts by weight of the whole of the monomer components constituting the acrylic polymer (A) that forms the surface portion of the pressure-sensitive adhesive layer, and (C) at least one hydrophilic polymer selected from polyalkylene glycols, polyvinylpyrrolidone, polyvinyl alcohol, and poly(meth)acrylic acid is contained in a proportion of from 0.5 to 15 parts by weight based on 100 parts by weight of non-volatile matters in the aqueous dispersion type pressure-sensitive adhesive composition of the whole of the pressure-sensitive adhesive layer.

As the anionic emulsifier (B) containing a sulfur atom, at least one sulfur atom-containing anionic emulsifier selected from alkyl sulfate type anionic emulsifiers, polyoxyethylene alkyl ether sulfate type anionic emulsifiers, polyoxyethylene alkylphenyl ether sulfate type anionic emulsifiers, sulfonate type anionic emulsifiers, and sulfosuccinic acid type anionic emulsifiers is preferable.

It is preferable that the proportion of the anionic emulsifier (B) containing a sulfur atom in the whole of the pressure-sensitive adhesive is from 0.5 to 5 parts by weight based on 100 parts by weight of the whole of the monomer components constituting the acrylic polymer (A) according to the aqueous dispersion type pressure-sensitive adhesive composition of the whole of the pressure-sensitive adhesive layer. Also, it is preferable that in the surface portion of the pressure-sensitive adhesive layer within the range of up to 3 nm inward from the outer face of the pressure-sensitive adhesive layer, a ratio of sulfur element by the ESCA measurement is less than 1 atomic %.

Also, there may be employed a constitution wherein the pressure-sensitive adhesive layer on one side of the substrate has a multilayered structure; the pressure-sensitive adhesive layer in the outermost side has a thickness of from 1 to 5 μm and contains the anionic emulsifier (B) containing a sulfur atom in a proportion of from 0.1 to 3 parts by weight based on 100 parts by weight of the whole of the monomer components constituting the acrylic polymer (A) that forms the pressure-sensitive adhesive layer in the outermost side; and the pressure-sensitive adhesive layer contains the anionic emulsifier (B) containing a sulfur atom in a proportion of from 0.5 to 5 parts by weight based on 100 parts by weight of the whole of the monomer components constituting the acrylic polymer (A) according to the aqueous dispersion type pressure-sensitive adhesive composition of the whole of the pressure-sensitive adhesive layer having a multilayered structure and contains the hydrophilic polymer (C) in a proportion of from 0.5 to 15 parts by weight based on 100 parts by weight of nonvolatile matters in the aqueous dispersion type pressure-sensitive adhesive composition of the whole of the pressure-sensitive adhesive layer. Moreover, there may be employed a constitution wherein the pressure-sensitive adhesive layer is formed of the aqueous dispersion type pressure-sensitive adhesive composition containing the anionic emulsifier (B) containing a sulfur atom in a proportion of from 3 to 5 parts by weight based on 100 parts by weight of the whole of the monomer components constituting the acrylic polymer (A); and in the surface portion of the pressure-sensitive adhesive layer within the range of up to 3 nm inward from the outer face of the pressure-sensitive adhesive layer, the anionic emulsifier (B) containing a sulfur atom is contained in a proportion of from 0.1 to 3 parts by weight based on 100 parts by weight of the whole of the monomer components constituting the acrylic polymer (A) that forms the surface portion of the pressure-sensitive adhesive layer.

As the substrate, a porous substrate can be suitably used.

DETAILED DESCRIPTION OF THE INVENTION

[Pressure-sensitive Adhesive Tape or Sheet]

The pressure-sensitive adhesive tape or sheet of the invention comprises a substrate having a pressure-sensitive adhesive layer on at least one side thereof, wherein the whole of the pressure-sensitive adhesive layer is formed of an aqueous dispersion type pressure-sensitive adhesive composition containing, as a base polymer, (A) an acrylic polymer containing a (meth)acrylic acid $C_{4-12}$ alkyl ester as the major monomer component; and in a surface portion of the pressure-sensitive adhesive layer within the range of up to 3 nm inward from the outer face of the pressure-sensitive adhesive layer, (B) an anionic emulsifier containing a sulfur atom (sometimes referred to as "sulfur atom-containing anionic emulsifier (B)") is contained in a proportion of from 0.1 to 3 parts by weight based on 100 parts by weight of the whole of the monomer components constituting the acrylic polymer (A) that forms the surface portion of the pressure-sensitive adhesive layer, and (C) at least one hydrophilic polymer selected from polyalkylene glycols, polyvinylpyrrolidone, polyvinyl alcohol, and poly(meth)acrylic acid is contained in a proportion of from 0.5 to 15 parts by weight based on 100 parts by weight of non-volatile matters in the aqueous dispersion type pressure-sensitive adhesive composition of the whole of the pressure-sensitive adhesive layer. Concretely, in the surface portion of the pressure-sensitive adhesive layer (within the range of up to 3 nm inward from the outer face of the pressure-sensitive adhesive layer), the proportion of the sulfur atom-containing anionic emulsifier (B) to be contained is not particularly limited so far as it is from 0.1 to 3 parts by weight based on 100 parts by weight of the whole of the monomer components constituting the acrylic polymer (A) that forms the surface portion of the pressure-sensitive adhesive layer, but is preferably from 0.1 to 2.5 parts by weight (more preferably from 0.5 to 2 parts by weight). When the proportion of the sulfur atom-containing anionic emulsifier (B) to be contained in the surface portion of the pressure-sensitive adhesive layer exceeds 3 parts by weight based on 100 parts by weight of the whole of the monomer components constituting the acrylic polymer (A) that forms the surface portion of the pressure-sensitive adhesive layer, an improving effect of the adhesion against the dewing surface or wetting surface is lowered, and the peeling-preventing properties under constant load is lowered. On the other hand, when the proportion of the sulfur atom-containing anionic emulsifier (B) to be contained is less than 0.1 part by weight, an improving effect of the adhesion against the dewing surface or wetting surface is lowered.

Also, in the invention, it is important that the proportion of the sulfur atom-containing anionic emulsifier (B) in the whole of the pressure-sensitive adhesive layer is from 0.5 to 5 parts by weight (preferably from 1 to 3 parts by weight) based on 100 parts by weight of the whole of the monomer components constituting the acrylic polymer (A) according to the aqueous dispersion type pressure-sensitive adhesive composition of the whole of the pressure-sensitive adhesive layer. When the amount of the sulfur atom-containing anionic emulsifier (B) to be used is less than 0.5 part by weight based on 100 parts by weight of the whole of the monomer components constituting the acrylic polymer (A) according to the aqueous dispersion type pressure-sensitive adhesive composition of the whole of the pressure-sensitive adhesive layer, polymerization stability during the preparation of the acrylic polymer (A) is lowered, and mechanical stability of the aqueous dispersion type pressure-sensitive adhesive composition (mechanical stability at the time of coating during the formation of the pressure-sensitive adhesive layer) is lowered. On the other hand, when it exceeds 5 parts by weight, water resistance of the pressure-sensitive adhesive layer is lowered.

Further, the hydrophilic polymer (C) is used in a proportion of from 0.5 to 15 parts by weight (preferably from 1 to 13 parts by weight, and more preferably from 1.5 to 10 parts by weight) based on 100 parts by weight of non-volatile matters (or solids) in the aqueous dispersion type pressure-sensitive adhesive composition of the whole of the pressure-sensitive adhesive layer. When the proportion of the hydrophilic polymer (C) to be contained is less than 0.5 part by weight based on 100 parts by weight of non-volatile matters in the aqueous dispersion type pressure-sensitive adhesive composition of the whole of the pressure-sensitive adhesive layer, an improving effect of the adhesion against the dewing surface or wetting surface is lowered. On the other hand, when it exceeds 15 parts by weight, viscosity of the pressure-sensitive adhesive increases so that the coating properties may possibly be adversely affected.

Moreover, it is desirable that in the surface portion of the pressure-sensitive adhesive layer, a ratio of sulfur element by the ESCA measurement is less than 1 atomic % (preferably from 0.1 to 0.8 atomic %). When in the surface portion of the pressure-sensitive adhesive layer, a ratio of sulfur element by the ESCA measurement is 1 atomic % or more, likewise the case where the proportion of the sulfur atom-containing anionic emulsifier (B) to be contained is high, an improving effect of the adhesion against the dewing surface or wetting surface is lowered, and the peeling-preventing properties under constant load is lowered.

Incidentally, the range of up to 3 nm inward from the outer face (surface) of the pressure-sensitive adhesive layer can be usually referred to as the surface portion of the pressure-sensitive adhesive layer. This varies depending upon the measurement. This is because for example, in the case where the surface portion of the pressure-sensitive adhesive is measured by the ESCA (Electron Spectroscopy for Chemical Analysis) measurement as described later, information of a depth of up to about 3 nm from the surface is usually obtained.

In the surface portion of the pressure-sensitive adhesive layer, the proportion of the sulfur atom-containing anionic emulsifier (B) to be contained and the ratio of sulfur element can be measured by the ESCA measurement. In the measurement according to the ESCA measurement, for example, an ESCA analyzer (analyzer name: Model 5400) manufactured by ULVAC-PHI, INCORPORATED can be used. Thus, in the case where an ESCA analyzer (analyzer name: Model 5400) manufactured by ULVAC-PHI, INCORPORATED is used, the proportion of the sulfur atom-containing anionic emulsifier (B) to be contained and the ratio of sulfur element can be determined by the wide scanning measurement under conditions of ray source (X-ray source): MgKα [300 W (15 kV)], photoelectron taking-out angle: 45°, analysis area: 1.1 mmφ and further by the narrow scanning measurement with respect to the detected element.

Incidentally, the surface of the substrate is a peeling surface, and in the case where the pressure-sensitive adhesive layer is formed on the peeling surface, the pressure-sensitive adhesive tape or sheet can be utilized as a substrate-free double-sided pressure-sensitive adhesive tape or sheet. Also, in the case where the substrate does not have the peeling surface, the pressure-sensitive adhesive tape or sheet can be utilized as a substrate-containing pressure-sensitive adhesive tape or sheet (the pressure-sensitive adhesive layer may be formed on one side or both sides of the substrate).

In the invention, in order that the proportion of the sulfur atom-containing anionic emulsifier (B) to be contained in the surface portion of the pressure-sensitive adhesive layer may be from 0.1 to 3 parts by weight based on 100 parts by weight of the whole of the monomer components constituting the acrylic polymer (A) that forms the surface portion of the pressure-sensitive adhesive layer, there may be, for example, the following methods.

(1) A method in which an aqueous dispersion type pressure-sensitive adhesive composition in which the proportion of the sulfur atom-containing anionic emulsifier (B) is from 0.1 to 3 parts by weight based on 100 parts by weight of the whole of the monomer components constituting the acrylic polymer (A) as the base polymer is used as the aqueous pressure-sensitive adhesive composition forming the pressure-sensitive adhesive layer.

(2) A method in which even by using an aqueous dispersion type pressure-sensitive adhesive composition in which the proportion of the sulfur atom-containing anionic emulsifier (B) exceeds 3 parts by weight (for example, exceeding 3 parts by weight and not more than 5 parts by weight) based on 100 parts by weight of the whole of the monomer components constituting the acrylic polymer (A) as the base polymer, the pressure-sensitive adhesive layer is formed such that in the surface portion of the pressure-sensitive adhesive layer, the proportion of the sulfur atom-containing anionic emulsifier (B) is from 0.1 to 3 parts by weight based on 100 parts by weight of the whole of the monomer components constituting the acrylic polymer (A) that forms the surface portion of the pressure-sensitive adhesive layer.

(3) A method in which the pressure-sensitive adhesive layer is of a multilayered structure (such as a two-layer structure), and an aqueous dispersion type pressure-sensitive adhesive composition in which the proportion of the sulfur atom-containing anionic emulsifier (B) is from 0.1 to 3 parts by weight based on 100 parts by weight of the whole of the monomer components constituting the acrylic polymer (A) as the base polymer is used as the aqueous pressure-sensitive adhesive composition forming the pressure-sensitive adhesive layer in the outermost side.

In the foregoing method (1), the pressure-sensitive adhesive layer on either one side of the substrate is a pressure-sensitive adhesive layer of a single-layer structure made of the aqueous dispersion type pressure-sensitive adhesive composition, and the pressure-sensitive adhesive layer is formed of an aqueous dispersion type pressure-sensitive adhesive composition in which the proportion of the sulfur atom-containing anionic emulsifier (B) is from 0.1 to 3 parts by weight based on 100 parts by weight of the whole of the monomer components constituting the acrylic polymer (A) as the base polymer. Accordingly, it is possible to make the proportion of the sulfur atom-containing anionic emulsifier (B) to be contained in the surface portion of the pressure-sensitive adhesive layer within the range of from 0.1 to 3 parts by weight based on 100 parts by weight of the whole of the monomer components constituting the acrylic polymer (A) that forms the surface portion of the pressure-sensitive adhesive layer. As a matter of course, in this case, the proportion of the sulfur atom-containing anionic emulsifier (B) in the whole of the pressure-sensitive adhesive layer becomes from 0.1 to 3 parts by weight based on 100 parts by weight of the whole of the monomer components constituting the acrylic polymer (A) according to the aqueous dispersion type pressure-sensitive adhesive composition of the whole of the pressure-sensitive adhesive layer.

In the foregoing method (2), the pressure-sensitive adhesive layer on either one side of the substrate is a pressure-sensitive adhesive layer of a single-layer structure made of the aqueous dispersion type pressure-sensitive adhesive composition, and the concentration of the sulfur-containing anionic emulsifier (B) in the pressure-sensitive adhesive layer is provided with an inclination such that the concentration increases inward from the surface. Accordingly, even when an aqueous dispersion type pressure-sensitive adhesive composition containing the sulfur atom-containing anionic emulsifier (B) in a proportion exceeding 3 parts by weight (for example, a proportion exceeding 3 parts by weight and not more than 5 parts by weight) based on 100 parts by weight of the whole of the monomer components constituting the acrylic polymer (A) that forms the pressure-sensitive adhesive layer is used, it is possible to make the proportion of the sulfur atom-containing anionic emulsifier (B) to be contained in the surface portion of the pressure-sensitive adhesive layer within the range of from 0.1 to 3 parts by weight based on 100 parts by weight of the whole of the monomer components constituting the acrylic polymer (A) that forms the surface portion of the pressure-sensitive adhesive layer. As a matter of course, in this case, the proportion of the sulfur atom-containing anionic emulsifier (B) in the whole of the pressure-sensitive adhesive layer is corresponding to the used aqueous dispersion type pressure-sensitive adhesive composition.

In these methods (1) and (2), it is important to use an aqueous dispersion type pressure-sensitive adhesive composition containing the hydrophilic polymer (C) in a proportion of from 0.5 to 15 parts by weight based on 100 parts by weight of non-volatile matters (or solids) thereof.

Incidentally, in the foregoing methods (1) and (2), in the case of double-sided pressure-sensitive adhesive tapes or sheets, the pressure-sensitive adhesive layer on the other side is not particularly limited with respect to the layer structure but may be a pressure-sensitive adhesive layer to be formed by the method (1) or (2) or a pressure-sensitive adhesive layer to be formed by the method (3). Alternatively, such a pressure-sensitive adhesive layer may be formed using other pressure-sensitive adhesive composition.

In the foregoing method (3), the pressure-sensitive adhesive layer on either one side of the substrate is a pressure-sensitive adhesive layer of a multilayered structure, and in the pressure-sensitive adhesive layer of the multilayered structure, the pressure-sensitive adhesive layer in the outermost side is formed of an aqueous dispersion type pressure-sensitive adhesive composition in which the proportion of the sulfur atom-containing anionic emulsifier (B) is from 0.1 to 3 parts by weight based on 100 parts by weight of the whole of the monomer components constituting the acrylic polymer (A) as the base polymer. Accordingly, it is possible to make the proportion of the sulfur atom-containing anionic emulsifier (B) contained in the surface portion of the pressure-sensitive adhesive layer having a multilayered structure within the range of from 0.1 to 3 parts by weight based on 100 parts by weight of the whole of the monomer components constituting the acrylic polymer (A) that forms the pressure-sensitive adhesive layer in the outmost side.

In the case of having the pressure-sensitive adhesive layer of a multilayered structure, it is important that the proportion of the hydrophilic polymer (C) is from 0.5 to 15 parts by weight based on 100 parts by weight of non-volatile matters (or solids) in the aqueous dispersion type pressure-sensitive adhesive composition according to the whole of the pressure-sensitive adhesive layer having a multilayered structure. Also, the proportion of the sulfur atom-containing anionic emulsifier (B) is not particularly limited but is preferably, for example, from 0.5 to 5 parts by weight based on 100 parts by weight of the whole of the monomer components constituting the whole of the acrylic polymers (A) according to the aqueous dispersion type pressure-sensitive adhesive composition of the whole of the pressure-sensitive adhesive layer having a multilayered structure. For this reason, it is preferable to use an aqueous dispersion type pressure-sensitive adhesive composition in which the proportion of the sulfur atom-containing anionic emulsifier (B) is from 0.5 to 5 parts by weight based on 100 parts by weight of the whole of the monomer components constituting the acrylic polymer (A) as the aqueous dispersion type pressure-sensitive adhesive composition for forming the pressure-sensitive adhesive layer other than the pressure-sensitive adhesive layer in the outermost side. Accordingly, an aqueous dispersion type pressure-sensitive adhesive composition in which the foregoing proportion exceeds 3 parts by weight (for example, exceeding 3 parts by weight and not more than 5 parts by weight) may be employed.

In the method (3), it is important to use an aqueous dispersion type pressure-sensitive adhesive composition according to each layer such that the proportion of the hydrophilic polymer (C) in the whole of the pressure-sensitive adhesive layer having a multilayered structure falls within the range of from 0.5 to 15 parts by weight based on 100 parts by weight of non-volatile matters (or solids) in the aqueous dispersion type pressure-sensitive adhesive composition in the whole of the pressure-sensitive adhesive layer.

Incidentally, in the foregoing method (3), in the case of double-sided pressure-sensitive adhesive tapes or sheets, the pressure-sensitive adhesive layer on the other side is not particularly limited with respect to the layer structure but may be a pressure-sensitive adhesive layer to be formed by the method (1) or (2) or a pressure-sensitive adhesive layer to be formed by the method (3). Alternatively, such a pressure-sensitive adhesive layer may be formed using other pressure-sensitive adhesive composition.

[Aqueous Dispersion Type Pressure-sensitive Adhesive Composition]

In the invention, the pressure-sensitive adhesive is formed of an aqueous dispersion type pressure-sensitive adhesive composition containing, as a base polymer, (A) an acrylic polymer containing a (meth)acrylic acid $C_{4-12}$ alkyl ester as the major monomer component. It is important that the aqueous dispersion type pressure-sensitive adhesive composition is constituted of an acrylic pressure-sensitive adhesive containing the acrylic polymer (A) as the base polymer and further contains specific proportions of the sulfur atom-containing anionic emulsifier (B) and the hydrophilic polymer (C).

(Acrylic Polymer (A))

The foregoing acrylic polymer (A) contains a (meth)acrylic acid $C_{4-12}$ alkyl ester as a major monomer component and optionally contains a copolymerizable monomer as a copolymerization component. The acrylic polymer (A) can be used singly or in admixture of two or more thereof.

Examples of the (meth)acrylic acid $C_{4-12}$ alkyl ester include n-butyl (meth)acrylate, isobutyl (meth)acrylate, sec-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, octyl (meth)acrylate, isooctyl (meth)acrylate, 2-ethylhexyl (meth)acrylate, nonyl (meth)acrylate, isononyl (meth)acrylate, decyl (meth)acrylate, isodecyl (meth)acrylate, undecyl (meth)acrylate, and dodecyl (meth)acrylate. The (meth)acrylic acid $C_{4-12}$ alkyl ester can be used singly or in admixture of two or more thereof.

The (meth)acrylic acid $C_{4-12}$ alkyl ester is contained as the major monomer component in the acrylic polymer. For this reason, it is important that the (meth)acrylic acid $C_{4-12}$ alkyl ester is contained in a proportion of 50% by weight or more (preferably 60% by weight or more, and more preferably 70% by weight or more) based on the whole amount of the monomer components in the acrylic polymer. Incidentally, the upper limit of the proportion of the (meth)acrylic acid $C_{4-12}$ alkyl ester to be contained is not particularly limited but may be 100% by weight (preferably 99% by weight, and more preferably 98% by weight) based on the whole amount of the monomer components in the acrylic polymer. Accordingly, for example, the proportion of the (meth)acrylic acid $C_{4-12}$ alkyl ester to be contained may fall within the range of from 50 to 98% by weight based on the whole amount of the monomer components. When the proportion of the (meth)acrylic acid $C_{4-12}$ alkyl ester to be contained is less than 50% by weight based on the whole amount of the monomer components, there may be the case where a pressure-sensitive adhesive revealing good peeling strength and cohesion is not obtained.

Incidentally, in the invention, among the illustrative examples of the (meth)acrylic acid $C_{4-12}$ alkyl ester, butyl acrylate, 2-ethylhexyl acrylate, isononyl acrylate, dodecyl acrylate (lauryl acrylate), butyl methacrylate, and dodecyl methacrylate (lauryl methacrylate) are preferable.

The copolymerizable monomer to be contained in the acrylic polymer is properly selected depending on the kind of the (meth)acrylic acid $C_{4-12}$ alkyl ester and the like. Examples of copolymerizable monomers that can be copolymerized with the (meth)acrylic acid $C_{4-12}$ alkyl ester include (meth)acrylic acid $C_{1-3}$ alkyl esters such as methyl (meth)acrylate, ethyl (meth)acrylate, n-propyl (meth)acrylate, and isopropyl (meth)acrylate; (meth)acrylic acid $C_{13-18}$ alkyl esters such as tridecyl (meth)acrylate, tetradecyl (meth)acrylate, pentadecyl (meth)acrylate, hexadecyl (meth)acrylate, and stearyl (meth)acrylate; (meth)acrylic acid alicyclic hydrocarbon esters such as cyclohexyl (meth)acrylate, bornyl (meth)acrylate, and isobornyl (meth)acrylate; carboxyl group-containing monomers such as (meth)acrylic acid, itaconic acid, maleic acid, fumaric acid, crotonic acid, and isocrotonic acid or anhydrides thereof; sulfonic acid group-containing monomers such as sodium vinylsulfonate; aromatic vinyl compounds such as substituted styrenes; cyano group-containing monomers such as acrylonitrile; olefins such as ethylene and butadiene; vinyl esters such a vinyl acetate; vinyl chloride; amide group-containing monomers such as acrylamide, methacrylamide, N-vinylpyrrolidone, and N,N-dimethyl (meth)acrylamide; hydroxyl group-containing monomers such as hydroxyalkyl (meth)acrylates and glycerin dimethacrylate; amino group-containing monomers such as aminoethyl (meth)acrylate and (meth)acryloyl morpholine; imido group-containing cyclohexyl maleimide and isopropyl maleimide; epoxy group-containing monomers such as glycidyl (meth)acrylate and methylglycidyl (meth)acrylate; and isocyanate group-containing monomers such as 2-methacryloyloxyethyl isocyanate. Polyfunctional copolymerizable monomers (polyfunctional monomers) such as triethylene glycol di(meth)acrylate, diethylene glycol di(meth)acrylate, ethylene glycol di(meth)acrylate, tetraethylene glycol di(meth)acrylate, neopentyl glycol di (meth) acrylate, 1,6-hexanediol di(meth)acrylate, trimethylolpropane tri(meth)acrylate, pentaerythritol tri (meth) acrylate, dipentaerythritol hexa(meth)acrylate, and divinylbenzene may also be used as the copolymerizable monomer. The copolymerizable monomer may be used singly or in admixture of two or more thereof. The term "(meth)acrylic" as used herein refers to "acrylic and/or methacrylic", the term "(meth)acrylate" as used herein refers to "acrylate and/or methacrylate", the term "(meth)acrylamide" as used herein refers to "acrylamide and/or methacrylamide", and the term "(meth)acryloyl" as used herein refers to "acryloyl and/or methacryloyl".

Such a copolymerizable monomer is used in a proportion of less than 50% by weight based on the whole amount of the monomer components. Incidentally, the lower limit of the amount of the copolymerizable monomer to be used is not particularly limited but is desirably 2% by weight based on the whole amount of the monomer components although no copolymerizable monomer may be used.

The acrylic polymer (A) can be prepared by subjecting the foregoing monomer(s) to the known or customary polymerization process (especially, the emulsion polymerization process). Also, in general, there can be employed the collective charge process (batch polymerization process), the monomer dropping process, the monomer emulsion dropping process, etc. In the case where monomers and the like are dropped, they may be continuously dropped or dividedly dropped. Incidentally, the polymerization temperature can be properly selected depending upon the kind of a polymerization initiator and the like and can be selected within the range of from 5 to 100° C.

Examples of polymerization initiators that are used in the polymerization include azo based initiators such as 2,2'-azobisisobutyronitrile, 2,2'-azobis(2-amidinopropane) dihydrochloride, 2,2'-azobis[2-(5-methyl-2-imidazolin-2-yl)propane] dihydrochloride, 2,2'-azobis(2-methylpropionamidine) disulfate, and 2,2'-azobis(N,N'-dimethyleneisobutylamidine) dihydrochloride; persulfates such as potassium persulfate and ammonium persulfate; peroxide based initiators such as benzoyl peroxide, t-butyl hydroperoxide, and hydroxide peroxide; and redox based initiators comprising a peroxide and a reducing agent, such as a combination of a persulfate and sodium bisulfite and a combination of a peroxide and sodium ascorbate. But, it should not be construed that the invention is limited thereto. Incidentally, the polymerization initiator may be a water-soluble initiator or an oil-soluble initiator. The amount of the polymerization initiator to be used can be properly selected depending upon the kind of the polymerization initiator and the kind of the monomer but in general, can be, for example, selected within the range of from about 0.01 to 1 part by weight based on 100 parts by weight of the monomer components.

Also, a chain transfer agent may be used in the polymerization. By using the chain transfer agent, it is possible to adjust the molecular weight of the acrylic polymer (A). As the chain transfer agent, usually employed chain transfer agents such as lauryl mercaptan, glycidyl mercaptan, mercaptoacetic acid, 2-mercaptoethanol, thioglycollic acid, 2-ethylhexyl thioglycollate, and 2,3-dimethylmercapto-1-propanol can be enumerated. The chain transfer agent can be used singly or in admixture of two or more thereof. The amount of the chain transfer agent to be used is usually in the range of from about 0.001 to 0.5 parts by weight based on 100 parts by weight of the monomer components.

The acrylic polymer (A) can be properly selected depending upon the monomer formulation and the amount or compounding proportion of the monomers to be used so far as it contains a (meth)acrylic acid $C_{4-12}$ alkyl ester as the major component of the monomers. For the sake of revealing good pressure-sensitive adhesion, it is desired to determine the formulation and compounding proportion such that the polymer usually has a glass transition temperature (Tg) of not higher than −20° C.

Incidentally, the weight average molecular weight of the acrylic polymer (A) may be about 200,000 or more (for example, from about 200,000 to 1,000,000), preferably from about 250,000 to 900,000, and more preferably from about 300,000 to 800,000.

(Sulfur Atom-containing Anionic Emulsifier (B))

The anionic emulsifier (B) containing a sulfur atom (sulfur atom-containing anionic emulsifier (B)) is not particularly limited so far as it is an anionic emulsifier containing at least one sulfur atom in the molecule. Also, the form of the sulfur atom contained in the sulfur atom-containing anionic emulsifier (B) is not particularly limited. Examples of the sulfur atom-containing anionic emulsifier (B) include alkyl sulfate type anionic emulsifiers such as sodium lauryl sulfate, ammonium lauryl sulfate, and potassium lauryl sulfate; polyoxyethylene alkyl ether sulfate type anionic emulsifiers such as polyoxyethylene lauryl ether sodium sulfate; polyoxyethylene alkylphenyl ether sulfate type anionic emulsifiers such as polyoxyethylene laurylphenyl ether ammonium sulfate and polyoxyethylene laurylphenyl ether sodium sulfate; sulfonate type anionic emulsifiers such as sodium dodecylbenzenesulfonate; and sulfosuccinate type anionic emulsifiers such as disodium lauryl sulfosuccinate and disodium polyoxyethylene lauryl sulfosuccinate. The sulfur atom-containing anionic emulsifier (B) can be used singly or in admixture of two or more thereof.

The sulfur atom-containing anionic emulsifier (B) can be used in combination with other emulsifier such as other anionic emulsifiers and nonionic emulsifiers (such as polyoxyethylene alkyl ethers, polyoxyethylene alkylphenyl ethers, polyoxyethylene fatty acid esters, and polyoxyethylene polyoxypropylene block polymers). Also, radical polymerizable emulsifiers into which a radical reactive group such as a propenyl group is introduced can be used in the sulfur atom-containing anionic emulsifier (B) and other emulsifier. In the case where such other emulsifier is jointly used, it is preferable that the whole amount of the emulsifiers falls within the range of from 0.5 to 5 parts by weight based on 100 parts by weight of the whole of the monomer components constituting the acrylic polymer (A).

In general, the acrylic polymer (A) is used in the emulsified state. Accordingly, the sulfur atom-containing anionic emulsifier (B) can be used when the acrylic polymer (A) is emulsified. In this case, the sulfur atom-containing anionic emulsifier (B) may be used when the acrylic polymer (A) is prepared by means of polymerization, or may be used when the acrylic polymer (A) previously prepared in various polymerization processes is dispersed in water and emulsified. Incidentally, by using the sulfur atom-containing anionic emulsifier (B), it is possible to carry out emulsification polymerization at the time of polymerization of the acrylic polymer (A).

By using the sulfur atom-containing emulsifier (B) when the acrylic polymer (A) is polymerized, it is possible to ensure stability of the polymerization. Accordingly, it is preferable to use the sulfur atom-containing anionic emulsifier (B) when the acrylic polymer (A) is polymerized. (Hydrophilic Polymer (C))

As the foregoing hydrophilic polymer (C), polyalkylene glycols, polyvinylpyrrolidone, polyvinyl alcohol, or poly(meth)acrylic acid can be used. The hydrophilic polymer (C) can be used singly or in admixture of two or more thereof.

In the hydrophilic polymer (C), examples of the polyalkylene glycols include homopolymers such as polyethylene glycol and polypropylene glycol; and copolymers such as an ethylene glycol-propylene glycol copolymer. As the polyvinylpyrrolidone, though polyvinylpyrrolidone as a homopolymer is suitable, copolymers of vinylpyrrolidone and other copolymerizable monomer can be used so far as they have hydrophilicity. As the polyvinyl alcohol, known or customary polyvinyl alcohols can be used, and the degree of hydrolysis thereof is not particularly limited so far as they have hydrophilicity. As the poly(meth)acrylic acid, homopolymers such as polyacrylic acid and polymethacrylic acid and copolymers such as an acrylic acid-methacrylic acid copolymer can be used. Besides, copolymers of acrylic acid and/or methacrylic acid and other copolymerizable monomer can be used so far as they have hydrophilicity.

The weight average molecular weight of the hydrophilic polymer (C) is not particularly limited but can be, for example, selected within the range of from about $0.5 \times 10^3$ to $5 \times 10^6$ (preferably from $0.8 \times 10^3$ to $3 \times 10^6$, and more preferably from $1 \times 10^3$ to $1 \times 10^6$) When the weight average molecular weight of the hydrophilic polymer (C) is too low, an improving effect of the adhesion against the dewing surface or wetting surface is lowered. On the other hand, when it is too high, viscosity of the pressure-sensitive adhesive increases so that the coating properties may possibly be adversely affected. Incidentally, when the weight average molecular weight of the hydrophilic polymer (C) is from $1 \times 10^3$ to $1 \times 10^6$, a balance between the improving effect of the adhesion against the dewing surface or wetting surface and the coating properties is especially excellent.

As the hydrophilic polymer (C), polyethylene glycol and polyvinylpyrrolidone are especially preferable from the viewpoint of satisfying all of the addition amount and weight average molecular weight thereof, the improving effect of the adhesion against the dewing surface or wetting surface, and the coating properties.

Incidentally, the hydrophilic polymer (C) may be contained by any method so far as it is contained in the pressure-sensitive adhesive layer, but it is preferable that the hydrophilic polymer (C) is contained in the pressure-sensitive adhesive layer by containing it in the aqueous dispersion type pressure-sensitive adhesive composition. The hydrophilic polymer (C) may be used and contained in the aqueous dispersion type pressure-sensitive adhesive composition prior to the polymerization of the acrylic polymer (A) of the acrylic pressure-sensitive adhesive. However, in order that the polymerization of the acrylic polymer (A) may not be adversely affected, it is preferable to contain the hydrophilic polymer (C) in the aqueous dispersion type pressure-sensitive adhesive composition by adding it as an aqueous solution after the polymerization of the acrylic polymer (A).

Thus, the aqueous dispersion type pressure-sensitive adhesive composition contains the acrylic polymer (A), the sulfur atom-containing anionic emulsifier (B), and the hydrophilic polymer (C). In the aqueous dispersion type pressure-sensitive adhesive composition, with respect to the proportion of the sulfur atom-containing anionic emulsifier (B) to be contained, in the case where the sulfur atom-containing anionic emulsifier (B) is used when the acrylic polymer (A) is polymerized, the amount (proportion) of the sulfur atom-containing anionic emulsifier (B) to be used (contained) can be usually selected within the range of from about 0.1 to 5 parts by weight (preferably from 0.5 to 5 parts by weight, and more preferably from 1 to 3 parts by weight) based on 100 parts by weight of the whole of the monomer components constituting the acrylic polymer (A). Incidentally, when the amount of the sulfur atom-containing anionic emulsifier (B) to be used is too low, the polymerization stability is lowered.

On the other hand, in the case where the sulfur atom-containing anionic emulsifier (B) is used when the previously prepared acrylic polymer (A) is emulsified, the amount (proportion) of the sulfur atom-containing anionic emulsifier (B) to be used (contained) can be usually selected within the range of from about 0.1 to 5 parts by weight (preferably from 0.5 to 5 parts by weight, and more preferably from 1 to 3 parts by weight) based on 100 parts by weight of the acrylic polymer (A). Incidentally, in the aqueous dispersion type pressure-sensitive adhesive composition, the amount of the acrylic polymer (A) and the amount of the whole of the monomer components constituting the acrylic polymer (A) are approximately equal to each other. Accordingly, the sulfur atom-containing anionic emulsifier (B) can be used in a proportion of from 0.1 to 5 parts by weight (preferably from 0.5 to 5 parts by weight, and more preferably from 1 to 3 parts by weight) based on 100 parts by weight of the whole of the monomer components constituting the acrylic polymer (A) regardless of whether the sulfur atom-containing anionic emulsifier (B) is used when the acrylic polymer (A) is polymerized or when the previously prepared acrylic polymer (A) is emulsified.

As a matter of course, the sulfur atom-containing anionic emulsifier (B) may be used when the acrylic polymer (A) is polymerized and when the acrylic polymer (A) thus prepared by means of the polymerization is emulsified. Even in this case, the amount (proportion) of the sulfur atom-containing anionic emulsifier (B) to be used (contained) can be selected within the foregoing range. That is, it is possible to use the sulfur atom-containing anionic emulsifier (B) in a proportion of from 0.1 to 5 parts by weight based on 100 parts by weight of the whole of the monomer components constituting the acrylic emulsifier (A), to use a part thereof when the acrylic polymer (A) is polymerized and to add the remainder after the polymerization.

On the other hand, the hydrophilic polymer (C) can be used in a proportion of from 0.5 to 15 parts by weight (preferably from 1 to 13 parts by weight, and more preferably from 1.5 to 10 parts by weight) based on 100 parts by weight of non-volatile matters (or solids) in the aqueous dispersion type pressure-sensitive adhesive composition.

Incidentally, in the aqueous dispersion type pressure-sensitive adhesive composition, a crosslinking agent can also be used in place of the polyfunctional monomer (or together with the polyfunctional monomer). Incidentally, it is possible to add such a crosslinking agent after the polymerization of the acrylic polymer (A) and prior to application of it onto the substrate, thereby improving cohesion of the pressure-sensitive adhesive. As the crosslinking agent, crosslinking agents that are usually used in acrylic pressure-sensitive adhesives can be used, and for example, any of water-soluble crosslinking agents or oil-soluble crosslinking agents may be employed. The crosslinking agent can be used singly or in admixture of two or more thereof. Concretely, examples of water-soluble crosslinking agents include epoxy based crosslinking agents (such as polyethylene glycol diglycidyl ether), aqueous dispersion type isocyanate based crosslinking agents, oxazoline based crosslinking agents, aziridine based crosslinking agents, hydrophilized carbodiimide based crosslinking agents, crosslinking agents containing an active methylol group or an active alkoxymethyl group, metallic chelate based crosslinking agents, melamine resin based crosslinking agents, and peroxide based crosslinking agents. Examples of oil-soluble crosslinking agents include epoxy based crosslinking agents (such as N,N,N',N'-tetraglycidyl-m-xylenediamine), isocyanate based crosslinking agents (such as hexamethylene diisocyanate), and oil-soluble carbodiimide based crosslinking agents. Incidentally, the amount of the crosslinking agent to be used is not particularly limited but may be an amount that is generally employed in acrylic pressure-sensitive adhesives.

If desired, the aqueous dispersion type pressure-sensitive adhesive composition may be compounded with bases (such as ammonia water) or acids for adjusting the pH and other additives that are usually used in pressure-sensitive adhesives, such as peeling adjusting agents, tackifiers, plasticizers, softeners, fillers, coloring agents (such as pigments and dyes), antioxidants, and surfactants.

In the pressure-sensitive adhesive tape or sheet of the invention, the pressure-sensitive adhesive layer is formed on at least one side of the substrate. The thickness of the pressure-sensitive adhesive layer (in the case where the pressure-sensitive adhesive layer is of a multilayered structure, the thickness means a total thickness after drying) is not particularly limited but can be selected within the range of from about 1 to 300 μm and is usually from about 5 to 80 μm. Incidentally, in the case where the pressure-sensitive adhesive layer has a multilayered structure, it is actually difficult to make the pressure-sensitive adhesive layer in the outermost side have a thickness of less than 1 μm. But, it is preferable that the thickness of the pressure-sensitive adhesive layer in the outermost side is made thin as far as possible and for example, may fall within the range of from about 1 to 5 μm (preferably from 1 to 3 μm). The thickness of the pressure-sensitive adhesive layer other than the pressure-sensitive adhesive layer in the outermost side is not particularly limited but can be properly selected such that the total thickness (thickness of the whole of the pressure-sensitive adhesive layer having a multilayered structure) becomes the above-enumerated thickness (total thickness) of the pressure-sensitive adhesive layer.

It is preferable that the pressure-sensitive adhesive tape or sheet is a pressure-sensitive adhesive tape or sheet having a substrate. Examples of such a substrate include plastic films (such as polyethylene films, polypropylene films, ethylene-propylene copolymer films, polyester films, polyimide films, polyvinyl chloride films, and polyvinyl acetate films), metallic foils, and porous substrates. In the invention, porous substrates can be suitably used as the substrate. Examples of porous substrates include paper based porous substrates (such as Japanese paper, craft paper, and crepe paper) and cloth based porous substrates (such as non-woven fabrics and woven fabrics). Above all, use of Japanese paper as the substrate in the case where the pressure-sensitive adhesive tape or sheet is a masking tape, or use of a non-woven fabric as the substrate in the case where the pressure-sensitive adhesive tape or sheet is a double-sided pressure-sensitive adhesive tape or sheet, is especially effective for improving the initial adhesion against the dewing surface or wetting surface.

As the Japanese paper, beaten wood pulps or mixtures of the wood pulps with synthetic short fibers can be suitably used. Examples of synthetic polymers in the synthetic short fibers include various synthetic polymers such as vinylon, nylon, polyesters, polypropylene, and polyvinyl chloride.

As the non-woven fabric, mixtures of general fibers with pulps can be suitably used.

The basis weight of the porous substrate is not particularly limited but for example, may be in the range of from about 5 to 200 $g/m^2$. More concretely, in the case where the porous substrate is Japanese paper, the basis weight of the porous substrate is usually from about 20 to 100 $g/m^2$ (particularly from 25 to 50 $g/m^2$), and in the case where the porous substrate is a non-woven fabric, the basis weight of the porous substrate is usually from about 10 to 20 $g/m^2$.

The thickness of the substrate can be properly selected according to the aimed pressure-sensitive adhesive tape or sheet and for example, may fall within the range of from about 5 to 300 μm. More concretely, in the case where the substrate is Japanese paper, the thickness of the substrate is preferably from 40 to 200 μm (especially from 50 to 100 μm) from the viewpoints of strength and nerve, and in the case where the substrate is a non-woven fabric, the thickness of the substrate is generally from 30 to 50 μm.

Incidentally, the substrate may have any form of a single-layer form or a multiple-layered form.

The substrate (especially the porous substrate) may be subjected to impregnation treatment or filling treatment or various other known-or customary treatments such as peeling treatment depending upon the purpose.

The pressure-sensitive adhesive tape or sheet of the invention can be produced according to the usual production process of pressure-sensitive adhesive tapes or sheets depending upon the kind of the pressure-sensitive adhesive tape or sheet. For example, in the case where the pressure-sensitive adhesive tape or sheet has a substrate and has a single-layer pressure-sensitive adhesive layer, it is possible to prepare a pressure-sensitive adhesive tape or sheet (for example, a pressure-sensitive adhesive tape wound up in a rolled shape) by subjecting the substrate to undercoating treatment, back-sizing treatment, or backside treatment; and coating the foregoing aqueous dispersion type pressure-sensitive adhesive composition directly on at least one side (one side or both sides) of the substrate in a thickness (total thickness) after drying of from 5 to 300 μm (preferably from 5 to 80 μm), followed by drying, or coating the aqueous dispersion type pressure-sensitive adhesive composition directly on a separator in a thickness (total thickness) after drying of from 5 to 300 μm (preferably from 5 to 80 μm), drying and then transferring it onto the substrate.

Incidentally, in coating the aqueous dispersion type pressure-sensitive adhesive composition, customary coaters such as a gravure roll coater, a reverse roll coater, a kiss roll coater, a dip roll coater, a bar coater, a knife coater, and a spray coater can be used.

In the invention, for the sake of protecting the pressure-sensitive adhesive, it is desired to laminate a peeling film on the pressure-sensitive adhesive layer. Also, in the case where no peeling film is utilized, it is preferable that the back side of the substrate is subjected to backside treatment with a peeling treatment agent such as silicon based peeling agents and long chain alkyl based peeling agents.

Nevertheless in the pressure-sensitive adhesive tape or sheet of the invention, the pressure-sensitive adhesive layer is formed of an acrylic aqueous dispersion type pressure-sensitive adhesive composition, it can reveal a good initial adhesion against the dewing surface or wetting surface. Also, contamination due to low-molecular weight components eluted by water absorption and swelling at the time of peeling, or adhesive residue due to insufficient cohesion can be inhibited or prevented. Moreover, a force required for peeling under constant load is large so that the pressure-sensitive adhesive tape or sheet of the invention has excellent constant load peeling-preventing properties.

In addition, since the pressure-sensitive adhesive tape or sheet of the invention uses an aqueous acrylic pressure-sensitive adhesive, it is desirable from the standpoints of safety and environmental hygiene. Moreover, original adhesion of the acrylic pressure-sensitive adhesive is not lost substantially or entirely, but the excellent adhesion that the acrylic pressure-sensitive adhesive originally has can be exhibited.

According to the pressure-sensitive adhesive tape or sheet of the invention, not only a good adhesion against the dewing surface or wetting surface can be revealed, but also peeling-preventing properties under constant load is good.

The invention will be hereunder described in more detail with reference to the following Examples, but it should not be construed that the invention is limited thereto. Incidentally, all parts are a part by weight.

PREPARATION EXAMPLE 1 OF ACRYLIC PRESSURE-SENSITIVE ADHESIVE

A reactor equipped with a thermometer, a stirrer, a nitrogen introduction tube, and a reflex condenser was charged with 50 parts of water and purged with nitrogen with stirring at room temperature (25° C.) for one hour. Thereafter, 0.3 part of potassium persulfate was charged, and a monomer emulsion having 92 parts of 2-ethylhexyl acrylate, 5 parts of butyl acrylate, 2 parts of acrylonitrile, 1 part of acrylic acid and 0.8 part of sodium lauryl sulfate emulsified with 50 parts of water was then added dropwise thereto at 70° C. over 3 hours. Thereafter, the mixture was ripened at 75° C. for 2 hours to complete polymerization reaction. After cooling to room temperature, 2.2 parts of sodium lauryl sulfate was added to the reaction mixture, and the resulting mixture was neutralized with 10% by weight ammonia water to prepare a pressure-sensitive adhesive (hereinafter sometimes referred to as "pressure-sensitive adhesive A").

PREPARATION EXAMPLE 2 OF ACRYLIC PRESSURE-SENSITIVE ADHESIVE

The same procedures as in Preparation Example 1 of Acrylic Pressure-sensitive Adhesive were followed, except that the post addition of 2.2 parts of sodium lauryl sulfate after the polymerization reaction was not carried out, to prepare a pressure-sensitive adhesive (hereinafter sometimes referred to as "pressure-sensitive adhesive B").

PREPARATION EXAMPLE 3 OF ACRYLIC PRESSURE-SENSITIVE ADHESIVE

The same procedures as in Preparation Example 1 of Acrylic Pressure-sensitive Adhesive were followed, except that the amount of sodium lauryl sulfate during the preparation of the monomer emulsion was changed from 0.8 part to 2 parts and that the post addition of 2.2 parts of sodium lauryl sulfate after the polymerization reaction was not carried out, to prepare a pressure-sensitive adhesive (hereinafter sometimes referred to as "pressure-sensitive adhesive C").

PREPARATION EXAMPLE 4 OF ACRYLIC PRESSURE-SENSITIVE ADHESIVE

A reactor equipped with a thermometer, a stirrer, a nitrogen introduction tube, and a reflex condenser was charged with a mixture (monomer emulsion) having 46 parts of 2-ethylhexyl acrylate, 2.5 parts of butyl acrylate, 1 part of acrylonitrile, 0.5 part of acrylic acid and 2 parts of sodium lauryl sulfate emulsified with 75 parts of water and purged with nitrogen with stirring at room temperature (25° C.) for one hour. Thereafter, 0.025 part of 2,2'-azobis(N,N'-dimethyleneisobutylamidine) dihydro-chloride (polymerization initiator) was added, and the mixture was polymerized at a temperature of 50° C. for 3 hours (first stage polymerization). Thereafter, 0.1 part of potassium persulfate was further charged, and the mixture was polymerized while adding dropwise a mixture (monomer emulsion) having 46 parts of 2-ethylhexyl acrylate, 2.5 parts of butyl acrylate, 1 part of acrylonitrile, 0.5 part of acrylic acid and 1 part of sodium lauryl sulfate emulsified with 25 parts of water at 70° C. over 3 hours (second stage polymerization). Further, the reaction mixture was ripened at 75° C. for 2 hours and then cooled to room temperature, followed by neutralizing with 10% by weight ammonia water to prepare a pressure-sensitive adhesive (hereinafter sometimes referred to as "pressure-sensitive adhesive D").

PREPARATION EXAMPLE 5 OF ACRYLIC PRESSURE-SENSITIVE ADHESIVE

The same procedures as in Preparation Example 1 of Acrylic Pressure-sensitive Adhesive were followed, except that the amount of the sodium lauryl sulfate in the post addition after the polymerization reaction was changed from 2.2 parts to 3.2 parts, to prepare a pressure-sensitive adhesive (hereinafter sometimes referred to as "pressure-sensitive adhesive E").

EXAMPLE 1

To 100 parts by weight of non-volatile matters of the pressure-sensitive adhesive A, 10 parts of polyethylene glycol (weight average molecular weight: 1,000) and 0.3 parts of an oil-soluble epoxy based crosslinking agent (a trade name: Tetrad C, manufactured by Mitsubishi Gas Chemical Company, Inc.) were added to prepare an aqueous dispersion type pressure-sensitive adhesive composition. This aqueous dispersion type pressure-sensitive adhesive composition was coated in a thickness after drying of 25 μm on one side of Japanese paper (substrate) having a basis weight of 30 g/m² and then dried to form a pressure-sensitive adhesive layer on one side of the Japanese paper (hereinafter sometimes referred to as "pressure-sensitive adhesive tape A").

Also, 0.3 parts of an oil-soluble epoxy based crosslinking agent (a trade name: Tetrad C, manufactured by Mitsubishi Gas Chemical Company, Inc.) was added to 100 parts by weight of non-volatile matters of the pressure-sensitive adhesive B to prepare a pressure-sensitive adhesive composition. This pressure-sensitive adhesive composition was coated in a thickness after drying of 2 μm on one side of a polyethylene film having a thickness of 60 μm and then dried, which was then stuck on the pressure-sensitive adhesive layer side of the pressure-sensitive adhesive tape A, to obtain a pressure-sensitive adhesive tape.

EXAMPLE 2

To 100 parts by weight of non-volatile matters of the pressure-sensitive adhesive A, 2 parts of polyethylene glycol (weight average molecular weight: 1,000) and 0.3 parts of an oil-soluble epoxy based crosslinking agent (a trade name: Tetrad C, manufactured by Mitsubishi Gas Chemical Company, Inc.) were added to prepare an aqueous dispersion type pressure-sensitive adhesive composition. This aqueous dispersion type pressure-sensitive adhesive composition was coated in a thickness after drying of 25 μm on one side of Japanese paper (substrate) having a basis weight of 30 g/m$^2$ and then dried to form a pressure-sensitive adhesive layer on one side of the Japanese paper (hereinafter sometimes referred to as "pressure-sensitive adhesive tape B").

Also, 0.3 parts of an oil-soluble epoxy based crosslinking agent (a trade name: Tetrad C, manufactured by Mitsubishi Gas Chemical Company, Inc.) was added to 100 parts by weight of non-volatile matters of the pressure-sensitive adhesive C to prepare a pressure-sensitive adhesive composition. This pressure-sensitive adhesive composition was coated in a thickness after drying of 2 μm on one side of a polyethylene film having a thickness of 60 μm and then dried, which was then stuck on the pressure-sensitive adhesive layer side of the pressure-sensitive adhesive tape B, to obtain a pressure-sensitive adhesive tape.

EXAMPLE 3

To 100 parts by weight of non-volatile matters of the pressure-sensitive adhesive D, 2 parts of polyethylene glycol (weight average molecular weight: 500,000) and 0.2 parts of an oil-soluble epoxy based crosslinking agent (a trade name: Tetrad C, manufactured by Mitsubishi Gas Chemical Company, Inc.) were added to prepare an aqueous dispersion type pressure-sensitive adhesive composition. This aqueous dispersion type pressure-sensitive adhesive composition was coated in a thickness after drying of 27 μm on one side of Japanese paper (substrate) having a basis weight of 30 g/m$^2$ and then dried to obtain a pressure-sensitive adhesive tape.

COMPARATIVE EXAMPLE 1

To 100 parts by weight of non-volatile matters of the pressure-sensitive adhesive A, 0.3 parts of an oil-soluble epoxy based crosslinking agent (a trade name: Tetrad C, manufactured by Mitsubishi Gas Chemical Company, Inc.) was added to prepare an aqueous dispersion type pressure-sensitive adhesive composition. This aqueous dispersion type pressure-sensitive adhesive composition was coated in a thickness after drying of 27 μm on one side of Japanese paper (substrate) having a basis weight of 30 g/m$^2$ and then dried to obtain a pressure-sensitive adhesive tape.

COMPARATIVE EXAMPLE 2

To 100 parts by weight of non-volatile matters of the pressure-sensitive adhesive E, 0.3 parts of an oil-soluble epoxy based crosslinking agent (a trade name: Tetrad C, manufactured by Mitsubishi Gas Chemical Company, Inc.) was added to prepare an aqueous dispersion type pressure-sensitive adhesive composition. This aqueous dispersion type pressure-sensitive adhesive composition was coated in a thickness after drying of 2 μm on one side of a polyethylene film having a thickness of 60 μm and then dried, which was then stuck on the pressure-sensitive adhesive layer side of the pressure-sensitive adhesive tape B of Example 2, to obtain a pressure-sensitive adhesive tape.

COMPARATIVE EXAMPLE 3

To 100 parts by weight of non-volatile matters of the pressure-sensitive adhesive D, 0.2 parts of an oil-soluble epoxy based crosslinking agent (a trade name: Tetrad C, manufactured by Mitsubishi Gas Chemical Company, Inc.) was added to prepare an aqueous dispersion type pressure-sensitive adhesive composition. This aqueous dispersion type pressure-sensitive adhesive composition was coated in a thickness after drying of 27 μm on one side of Japanese paper (substrate) having a basis weight of 30 g/m$^2$ and then dried to obtain a pressure-sensitive adhesive tape.

(Evaluation Methods)

The pressure-sensitive adhesive tapes obtained in Examples 1 to 3 and Comparative Examples 1 to 3 were measured with respect to the adhesion against the dewing surface of wetting surface of glass, the peeling rate under constant load, and the ratio of sulfur element on the surface in the following measurement methods. The measurement or evaluation results are shown in Table 1.

Incidentally, in any of the measurement methods, with respect to the pressure-sensitive adhesive tape having a polyethylene film stuck thereon, the measurement was carried out after peeling away the polyethylene film.

(Measurement Method of Adhesion Against the Wetting Surface)

A glass as the adherend was kept within a box set at a temperature of 0° C. placed in a thermo-hygrostatic chamber of 23° C.×65% RH for one hour. Then, the glass was taken out from the box (at this time, the glass surface became in the dewing state or wetting state); 10 seconds thereafter, the pressure-sensitive adhesive tape cut into a width of 18 mm (each of the pressure-sensitive adhesive tapes obtained in Examples 1 to 3 and Comparative Examples 1 to 3) was stuck on the glass by reciprocating a roller of 2 kg one time; 10 seconds after sticking, the pressure-sensitive adhesive tape was peeled at an angle of 180° at a peeling rate of 300 mm/min, to measure an adhesion (N/18 mm-width) against the dewing surface or wetting surface of glass (hereinafter sometimes referred to as "adhesion against the wetting surface").

(Measurement Method of Peeling Rate Under Constant Load)

The pressure-sensitive adhesive tape cut into a width of 18 mm (each of the pressure-sensitive adhesive tapes obtained in Examples 1 to 3 and Comparative Examples 1 to 3) was stuck on an acrylic board by reciprocating a roller of 500 g one time and 30 minutes after sticking, fixed on the acrylic board such that the peeling angle became 90° while applying a load of 30 g on the terminal ends of the pressure-sensitive adhesive tape. The peeling distance per hour in an atmosphere at 23° C. was measured, thereby determining a peeling rate (cm/hr) under constant load.

(Measurement Method of Ratio of Sulfur Element on the Surface)

Using an ESCA analyzer (analyzer name: Model 5400) manufactured by ULVAC-PHI, INCORPORATED, the surface of the pressure-sensitive adhesive layer of each of the pressure-sensitive adhesive tapes obtained in Examples 1 to 3 and Comparative Examples 1 to 3 was qualitatively analyzed by the wide scanning measurement under conditions of ray source (X-ray source): MgKα [300 W (15 kV)], photoelectron taking-out angle: 45°, analysis area: 1.1 mmφ and further by the narrow scanning measurement with respect to the detected element, thereby determining a ratio of sulfur element (atomic %) on the surface of the pressure-sensitive adhesive layer of each of the pressure-sensitive adhesive tapes.

TABLE 1

|  | Example | | | Comparative Example | | |
| --- | --- | --- | --- | --- | --- | --- |
|  | 1 | 2 | 3 | 1 | 2 | 3 |
| Proportion of sodium lauryl sulfate (part by weight) | | | | | | |
| Inner portion | 3 | 3 | 3 | 3 | 3 | 3 |
| Surface portion | 0.8 | 2 | | | 4 | |
| Polyethylene glycol | | | | | | |
| Weight average molecular weight | 1,000 | 1,000 | 500,000 | No | 1,000 | No |
| Proportion (part by weight) | 10 | 2 | 2 | | 2 | |
| Ratio of sulfur element on the surface (atomic %) | 0.2 | 0.6 | 0.7 | 1.1 | 1.5 | 1.2 |
| Adhesion against the wetting surface (N/18 mm-width) | 0.4 | 0.2 | 0.6 | 0.02 | 0.03 | 0.02 |
| Peeling rate under constant load (cm/hr) | 0.8 | 1.5 | 1.5 | 30 | 40 | 30 |

The proportion of sodium lauryl sulfate in the inner portion of the pressure-sensitive adhesive layer is a proportion (a part by weight) based on 100 parts by weight of the whole of the monomer components of the acrylic polymer in the inner portion of the pressure-sensitive adhesive layer.

The proportion of sodium lauryl sulfate in the surface portion of the pressure-sensitive adhesive layer is a proportion (a part by weight) based on 100 parts by weight of the whole of the monomer components of the acrylic polymer in the surface portion of the pressure-sensitive adhesive layer.

The proportion of sodium lauryl sulfate in the inner portion and surface portion of the pressure-sensitive adhesive layer is a proportion (a part by weight) based on 100 parts by weight of the whole of the monomer components of the acrylic polymer in the inner portion and surface portion of the pressure-sensitive adhesive layer.

The proportion of polyethylene glycol is a proportion based on 100 parts by weight of solids of the aqueous dispersion type pressure-sensitive adhesive composition.

As is clear from Table 1, it has been confirmed that any of the pressure-sensitive adhesive tapes of Examples 1 to 3 are excellent in adhesion against the dewing surface or wetting surface of glass and have a good adhesion against the wetting surface as compared with the pressure-sensitive adhesive tapes of Comparative Examples 1 to 3. Also, any of the pressure-sensitive adhesive tapes of Examples 1 to 3 are good in peeling-preventing properties under constant load.

This is because in the Examples, the anionic emulsifier containing a sulfur atom is used as the emulsifier; the proportion of sodium lauryl sulfate as the anionic emulsifier containing a sulfur atom is proper in the surface portion of the pressure-sensitive adhesive layer (moreover, proper in the whole of the pressure-sensitive adhesive layer); and polyethylene glycol as the hydrophilic polymer is contained in a proper proportion.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive tape or sheet comprising a substrate having a pressure-sensitive adhesive layer on at least one side thereof, wherein the whole of the pressure-sensitive adhesive layer is formed of an aqueous dispersion pressure-sensitive adhesive composition containing, as a base polymer, (A) an acrylic polymer containing a (meth)acrylic acid $C_{4-12}$ alkyl ester as the major monomer component; wherein in a surface portion of the pressure-sensitive adhesive layer within the range of up to 3 nm inward from the outer face of the pressure-sensitive adhesive layer, (B) an anionic emulsifier containing a sulfur atom is contained in a proportion of from 0.1 to 3 parts by weight based on 100 parts by weight of the whole of the monomer components constituting the acrylic polymer (A) that forms the surface portion of the pressure-sensitive adhesive layer, wherein the concentration of the anionic emulsifier (B) containing a sulfur atom is increased inward from the surface; and wherein (C) at least one hydrophilic polymer selected from a homopolymer of polyethylene glycol, a homopolymer of polypropylene glycol, polyvinylpyrrolidone, polyvinyl alcohol, and poly(meth)acrylic acid is contained in a proportion of from 0.5 to 15 parts by weight based on 100 parts by weight of nonvolatile matters in the aqueous dispersion pressure-sensitive adhesive composition of the whole of the pressure-sensitive adhesive layer, wherein the hydrophilic polymer is added as an aqueous solution after the polymerization of the acrylic polymer.

2. The pressure-sensitive adhesive tape or sheet according to claim 1, wherein the anionic emulsifier (B) containing a sulfur atom is at least one sulfur atom-containing anionic emulsifier selected from alkyl sulfate anionic emulsifiers, polyoxyethylene alkyl ether sulfate anionic emulsifiers, polyoxyethylene alkylphenyl ether sulfate anionic emulsifiers, sulfonate anionic emulsifiers, and sulfosuccinic acid anionic emulsifiers.

3. The pressure-sensitive adhesive tape or sheet according to claim 1, wherein the proportion of the anionic emulsifier (B) containing a sulfur atom in the whole of the pressure-sensitive adhesive layer is from 0.5 to 5 parts by weight based on 100 parts by weight of the whole of the monomer components constituting the acrylic polymer (A) according to the aqueous dispersion pressure-sensitive adhesive composition of the whole of the pressure-sensitive adhesive layer.

4. The pressure-sensitive adhesive tape or sheet according to claim 1, wherein in the surface portion of the pressure-sensitive adhesive layer within the range of up to 3 nm inward from the outer face of the pressure-sensitive adhesive layer, a ratio of sulfur element by the ESCA measurement is less than 1 atomic %.

5. The pressure-sensitive adhesive tape or sheet according to claim 1, wherein the pressure-sensitive adhesive layer on one side of the substrate has a multilayered structure; an outermost layer of the multilayered pressure-sensitive adhesive layer has a thickness of from 1 to 5 µm and contains the anionic emulsifier (B) containing a sulfur atom in a proportion of from 0.1 to 3 parts by weight based on 100 parts by weight of the whole of the monomer components constituting the acrylic polymer (A) that forms the outermost layer of the multilayered pressure-sensitive adhesive layer; and the multilayered pressure-sensitive adhesive layer, as a whole, contains (i) the anionic emulsifier (B) containing a sulfur atom in a proportion of from 0.5 to 5 parts by weight based on 100 parts by weight of the whole of the monomer components constituting the acrylic polymer (A) that forms the multilayered pressure-sensitive adhesive layer and (ii) the hydrophilic polymer (C) in a proportion of from 0.5 to 15 parts by weight based on 100 parts by weight of non-volatile matters in the aqueous dispersion pressure-sensitive adhesive composition that forms the multilayered pressure-sensitive adhesive layer.

6. The pressure-sensitive adhesive tape or sheet according to claim 1, wherein the pressure-sensitive adhesive layer is formed of the aqueous dispersion pressure-sensitive adhesive composition containing the anionic emulsifier (B) containing a sulfur atom in a proportion of from 3 to 5 parts by weight based on 100 parts by weight of the whole of the monomer components constituting the acrylic polymer (A).

7. The pressure-sensitive adhesive tape or sheet according to claim 1, wherein the substrate is a porous substrate.

\* \* \* \* \*